United States Patent
Setsuda

(10) Patent No.: US 6,230,833 B1
(45) Date of Patent: May 15, 2001

(54) STORAGE BATTERY TUNING OF ENGINE AIR INTAKE SYSTEM

(75) Inventor: David Joseph Setsuda, Farmington Hills, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/348,929

(22) Filed: Jul. 6, 1999

(51) Int. Cl.$^7$ .................................................. B60R 16/04
(52) U.S. Cl. ............................... 180/68.5; 180/68; 180/3; 248/503; 429/62; 429/120; 123/184.21
(58) Field of Search ................... 180/68.5, 68.3; 248/503; 429/12, 61, 62, 71; 123/184.21, 41.56

(56) References Cited

U.S. PATENT DOCUMENTS

| | | | |
|---|---|---|---|
| 1,266,780 | * 5/1918 | Edison | 429/62 |
| 2,104,766 | * 1/1938 | Saunders | 180/68.5 |
| 4,013,136 | * 3/1977 | Fear | 180/68.5 |
| 4,126,734 | 11/1978 | Walters | 429/71 |
| 4,216,839 | * 8/1980 | Gould et al. | 180/65.1 |
| 4,468,440 | * 8/1984 | Evjen | 429/8 |
| 4,682,751 | * 7/1987 | Tamas | 248/503 |
| 4,791,805 | 12/1988 | Gates | 73/40.7 |
| 4,976,327 | 12/1990 | Abujudom, II et al. | 180/68.2 |
| 5,031,712 | 7/1991 | Karolek et al. | 180/68.2 |
| 5,082,075 | 1/1992 | Karolek et al. | 180/68.2 |
| 5,215,834 | 6/1993 | Reher et al. | 429/62 |
| 5,320,190 | 6/1994 | Naumann et al. | 180/68.2 |
| 5,542,489 | 8/1996 | Allison et al. | 180/68.5 |
| 5,585,204 | * 12/1996 | Oshida et al. | 429/62 |
| 5,633,095 | * 5/1997 | Ishikawa et al. | 429/1 |
| 5,636,701 | * 6/1997 | Norman et al. | 180/68.5 |
| 5,639,571 | * 6/1997 | Waters et al. | 429/71 |
| 5,709,280 | * 1/1998 | Beckley et al. | 180/68.5 |
| 5,899,174 | * 5/1999 | Anderson et al. | 123/2 |
| 5,913,295 | 6/1999 | Sadr et al. . | |

FOREIGN PATENT DOCUMENTS

| | | |
|---|---|---|
| 8-93583 | * 4/1996 | (JP) . |
| 8-321290 | * 12/1996 | (JP) . |
| 9-272344 | * 10/1997 | (JP) . |

* cited by examiner

Primary Examiner—Paul N. Dickson
Assistant Examiner—Deanna Draper
(74) Attorney, Agent, or Firm—Larry I. Shelton

(57) ABSTRACT

An engine compartment (10) of an automotive vehicle houses an internal combustion engine (12) having an air intake system (14). The engine compartment also contains a electrical system storage battery (24). A tray (28) has a bottom wall (32) and upright walls (38, 40) forming side-by-side compartments (34, 36) that are open at the top. Fasteners (58) fastening the tray bottom wall at a first (34) of the compartments in a hard mounting to underlying structure of the vehicle that is spaced from the engine. The battery is disposed on the bottom wall in the first compartment. A cap (46) closes the open top of a second (36) of the compartments that adjoins the first compartment and cooperates with the second compartment to form an air box (16). The hard mounting of the battery compartment to the underlying vehicle structure and the cantilevering of the air box to one side attenuates transmission of objectionable air intake noise and vibration frequencies through the vehicle structure.

12 Claims, 1 Drawing Sheet

STORAGE BATTERY TUNING OF ENGINE AIR INTAKE SYSTEM

BACKGROUND OF THE INVENTION

1. Field of the Invention

This invention relates to automotive vehicles that are powered by internal combustion engines and that have electrical systems containing storage batteries.

2. Background Information

Lead-acid storage batteries are commonly used in electrical systems of automotive vehicles to provide electric energy for operating starter motors to crank engines that power the vehicles. During running of an engine, an alternator that is driven by the engine keeps the battery recharged through an electric regulator. It is generally desirable for the battery to be disposed in proximity to the engine so that ohmic losses can be minimized during cranking when current draw on the battery is quite high. Over time, such a battery ages, and eventually reaches a point where it is incapable of sustaining sufficient charge to serve the needs of a vehicle.

Heat is a contributor to battery aging, and because an engine in an engine compartment can at times be a source of significant heat, various arrangements have heretofore been proposed to shield the battery from engine heat. It is believed that the following U.S. patents are representative of the state of the art relating to thermal protection of a storage battery in an engine compartment: U.S. Pat. No. 4,126,734; U.S. Pat. No. 4,976,327; U.S. Pat. No. 5,031,712; U.S. Pat. No. 5,082,075; U.S. Pat. No. 5,215,834; U.S. Pat. No. 5,320,190; and U.S. Pat. No. 5,542,489. The inventor's pending U.S. patent application Ser. No. 09/348,928, of even date, bearing title STORAGE BATTERY PROTECTION BY ENGINE AIR INTAKE SYSTEM discloses further improvements in thermal protection of a battery using intake air for active cooling of the battery.

Because an engine vibrates to some degree when it is running, it is also known to mount the engine on a vehicle chassis through engine mounts containing elastomeric elements that isolate the chassis at least to some degree from vibrations propagating from the engine. A known design practice for associating an engine air intake system with an engine is to dispose an air box that contains an air filter element on the engine. Noise and vibration generated by the intake airflow will therefore also be inherently isolated from the chassis at least to some degree by virtue of the engine mounts.

If an air box could be mounted on other than an engine, more packaging options would be available for the design of an engine compartment, but the isolation that is obtained through the engine mounts would be lost. Accordingly, it would seem that the mounting an air box on body and/or chassis members of a vehicle would require the use of devoted vibration isolators to provide at least some degree of isolation of the air intake system noise and vibration from the chassis and body of the vehicle. Like engine noise and vibration, air intake system noise and vibration may contribute in a negative way to NVH (noise, vibration, harshness) characteristics of a vehicle.

It is therefore believed desirable if an air box could be mounted on body and/or chassis structure proximate an engine in an engine compartment so that objectionable noise and vibration frequencies created by airflow through the engine air intake system could be isolated from transmission through the air box to the body and/or chassis structure without the use of devoted vibration isolators.

SUMMARY OF THE INVENTION

In a general respect, the present invention relates to a novel association of an air box with a storage battery of a vehicle electrical system in an engine compartment of the vehicle for mounting the air box on other than the engine in a manner that does not require devoted vibration isolators for the mounting. An ancillary benefit of the association is that the air box may provide some degree of thermal shielding of the battery from engine compartment influences that tend to raise battery temperature.

A further aspect of the invention relates to certain integration of the air box and a tray on which the battery is supported. Such integration may have certain favorable implications to the cost-effectiveness of implementing the invention in a vehicle. Moreover, certain other engine-related components may also be integrated and/or otherwise associated with the air box and battery tray, further enhancing the cost-effectiveness of the invention.

A general aspect of the within claimed invention relates to an engine compartment of an automotive vehicle that houses an internal combustion engine having an air intake system and that also contains an electrical system storage battery, wherein a tray comprises a bottom wall, and fasteners fasten the tray bottom wall to underlying structure of the vehicle that is spaced from the engine. The battery is disposed on the bottom wall in overlying relation to the underlying vehicle structure. The tray further comprises a walled compartment which adjoins the bottom wall and has an interior forming an internal space of an air box through which intake air for the engine passes, and the battery is external to the air intake system.

Another general aspect relates to an engine compartment of an automotive vehicle that houses an internal combustion engine having an air intake system and that also contains an electrical system storage battery, wherein a tray comprises a bottom wall and upright walls forming side-by-side compartments that are open at the top. Fasteners fasten the tray bottom wall at a first of the compartments in a hard mounting to underlying structure of the vehicle that is spaced from the engine. The battery is disposed on the bottom wall in the first compartment. A cap closes the open top of a second of the compartments that adjoins the first compartment and cooperates with the second compartment to form an air box of the air intake system. The battery is external to the air intake system.

Still another general aspect relates to an engine compartment of an automotive vehicle that houses an internal combustion engine having an air intake system and that also contains an electrical system storage battery wherein a tray comprises a bottom wall and upright walls forming side-by-side compartments that are open at the top and that share a common upright imperforate wall. The battery is disposed in a first of the compartments. A cap closes the open top of a second of the compartments that adjoins the first compartment and cooperates with the second compartment to form an air box of the air intake system.

Other general and more specific aspects will been set forth in the ensuing description and claims.

BRIEF DESCRIPTION OF THE DRAWING

The drawing that will now be briefly described is incorporated herein to illustrate a preferred embodiment of the invention and a best mode presently contemplated for carrying out the invention.

DESCRIPTION OF THE PREFERRED EMBODIMENT

Figure 1:
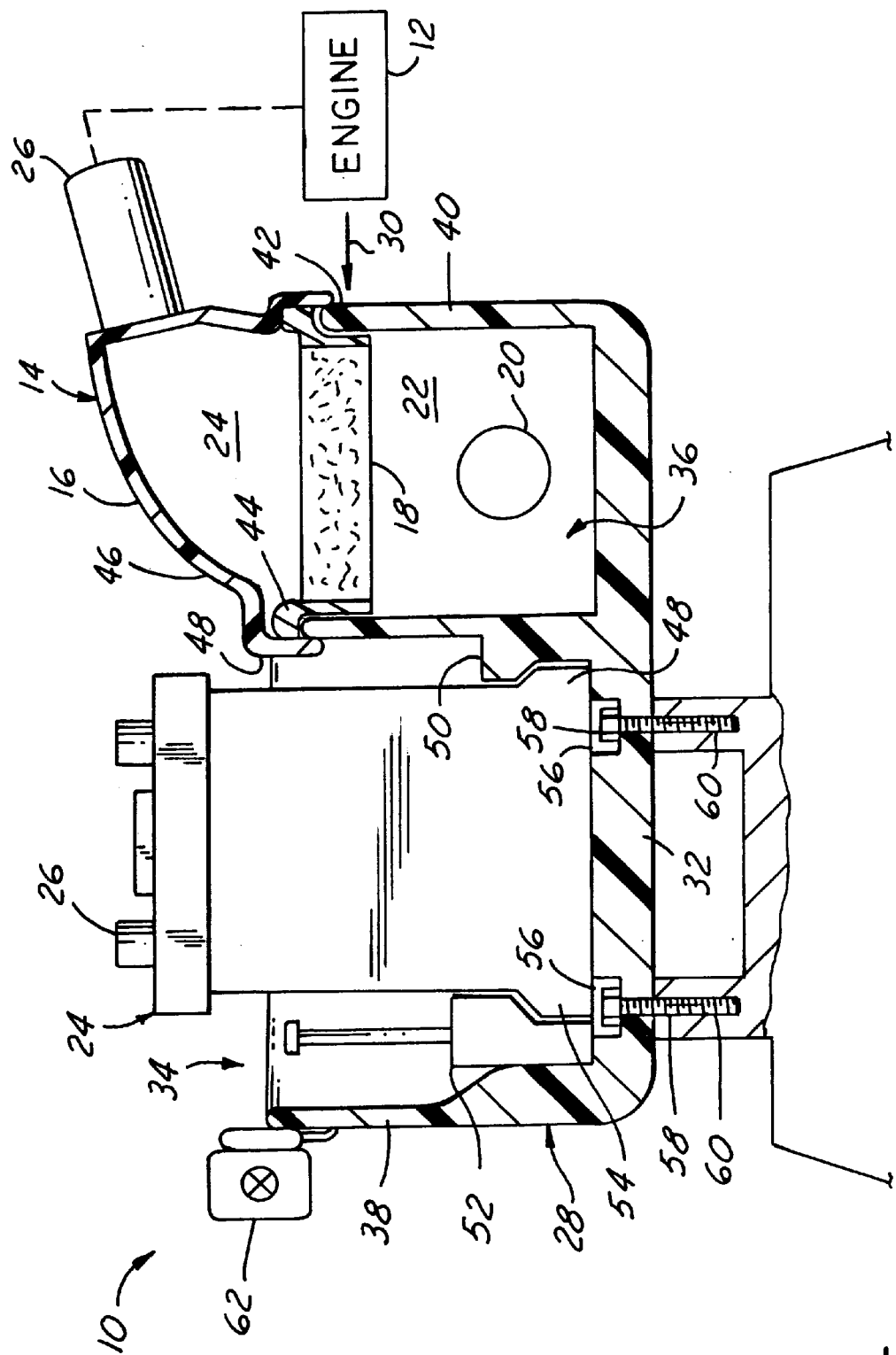
FIG. 1 is a vertical cross section view through a portion of a vehicle engine compartment relevant to the present invention.

FIG. 1 shows a portion of an engine compartment 10 of an automotive vehicle comprising an internal combustion engine 12. Engine compartment 10 is at the front of the vehicle, and the view of FIG. 1 is taken through the inner body/chassis structure of a left front fender looking toward the front of the vehicle.

An air intake system 14 through which fresh air is conveyed into combustion chambers of engine 12 is also disposed within engine compartment 10. The illustrated air intake system 14 includes an air box 16 upstream of engine 12 and containing a particulate filter 18 for filtering certain particulates from the intake airflow. Air box 16 is disposed to the left of engine 12, as viewed by a driver of the vehicle.

Air box 16 comprises an inlet 20 through which unfiltered air, i.e. dirty air, enters. Filter 18 divides the interior of the air box into a dirty air space 22 and a clean air space 24, and air that enters dirty air space 22 via inlet 20 passes upward through filter 18. Filtered air passes from an outlet 26 of air box 16 through a conduit that leads to a manifold of engine 12 for distributing filtered air to the engine combustion chambers. Air may be supplied to air box inlet 20 through a duct structure (not shown).

Air box 16 is operatively associated with a D.C. storage battery 24 of the vehicle's electrical system in accordance with principles of the present invention. By itself, battery 24 is conventional, comprising a generally rectangular casing having positive and negative posts, one post 26 appearing in the drawings, via which it operatively connects with the electrical system. Battery 24 is typically a lead-acid storage battery that has substantial weight, and therefore supported in a secure, stable manner on weight-bearing structure of the vehicle, a battery tray 28 in particular. Within engine compartment 10, battery 24 is exposed to whatever ambient temperature is present there. When engine 12 is hot, heat may also radiate toward battery 24, as portrayed by arrow 30.

By constructing and arranging air box 16 in relation to battery 24 in accordance with certain ancillary principles of the invention calling for the air box to be disposed between the battery and the engine, battery 24 may be protectively shielded at least to some extent from engine compartment influences that tend to raise battery temperature. Accordingly, it is believed that this ancillary aspect of the invention provides a meaningful degree of beneficial battery cooling at elevated engine compartment temperatures.

Battery tray 28 is constructed from suitable material, such as polymeric material molded by known molding methods to a desired formed shape. It can be seen from FIG. 1 that air box 16 is integrated with tray 28. Tray 28 comprises a bottom wall 32 and upright walls that cooperate with bottom wall 32 to form two side-by-side compartments 34, 36 that are both open at their tops. A larger four-sided upright wall 38 bounds the larger compartment 34 and a smaller four-sided upright wall 40 bounds the smaller compartment 36. In the illustrated embodiment, one side of each wall 38, 40 that separates the compartments from each other is shared by both walls. That shared side is imperforate.

The four sides of wall 40 have an upper perimeter rim 42. Filter 18 comprises a matching perimeter frame 44 that seats the filter on rim 42 such that filter 18 encloses the top of compartment 36. Air box 16 comprises an outlet cap, or cover, 46 containing outlet 26. Cap 46 comprises a lower perimeter rim 48 that is shaped to telescope over rim 42, thereby closing the air box and capturing frame 44 between the two rims in an airtight manner. Thus filter 18 and the interior of compartment 36 cooperatively define dirty air space 22, while filter 18 and cap 46 cooperatively define clean air space 24. While air box 16 is shown to have a rectangular shape, it is contemplated that air boxes of other shapes may be integrated with battery tray 28.

Compartment 34 is also rectangular in shape in plan. It is large enough to allow battery 24 to pass through the open top and be slid sideways to lodge a cleat 48 at one side of the battery casing between the bottom wall of the tray and an overhang 50 formed in the shared wall of the two compartments. A clamp 52 is then tightened on tray 28 against a cleat 54 at the opposite side of the battery casing, thereby securing battery 24 in place on the tray within compartment 34.

Typically tray 28 has been mounted in the vehicle before battery 24 is placed in compartment 34. Bottom wall 32 comprises several counterbored through-holes 56, and the threaded shanks of headed fasteners 58 are passed through holes 56 and threaded into underlying holes 60 in body and/or chassis structure of the vehicle. Fasteners 58 are tightened to hold tray 28 fast against the underlying body/chassis structure.

The drawing shows that the weight of battery 24 bears directly on the body/chassis structure through the intervening tray, and that air box 16 is disposed to the side overhanging the attachment of the tray to the chassis/body structure. In other words, the air box is in effect cantilever-mounted from the underlying body/chassis structure, albeit a somewhat short cantilever. At air box 16, the tray bottom wall is out of contact with and unattached to any underlying vehicle structure.

Because of the substantial mass of the battery overlying the underlying vehicle structure to which the tray is attached, the combined structure acts like a noise and vibration isolator, or damper, with respect to air box 16. In other words, it is effective to prevent objectionable noise and vibration arising from intake airflow through air box 16 from being transmitted to the body/chassis structure of the vehicle. It is to be observed that the battery tray has a hard mounting to the vehicle, one that does not use elastomeric elements for noise and vibration damping. In accordance with good design practice, the tray is constructed to possess suitable rigidity, and because of the presence of battery 24, it is desirable that the tray material be resistant to electrolyte used in the battery.

It is believed that physical parameters of the battery and the tray can provide damping over a frequency range running from about 50 hertz to about 1000 hertz, a range characteristic of certain intake air flows that are experienced during engine operation in a vehicle. Some degree of tuning is possible by appropriate selection of various physical parameters such as dimensions and weights.

While a primary objective of the invention is to provide attenuation of air intake system noise and vibration into the vehicle chassis/body structure, an ancillary benefit is that other components may take advantage of the available mounting locations on the tray. The drawing shows an emission control valve 62 mounted on the exterior of an upright wall of the battery compartment.

Specific constructional details of any particular embodiment of the present invention are apt to depend to some extent on vehicle design factors such as engine compartment size and placement of the battery in relation to the engine, and noise and vibration frequencies of interest.

While a presently preferred embodiment has been illustrated and described, it is to be appreciated that the invention may be practiced in various forms within the scope of the following claims.

What is claimed is:

1. An engine compartment of an automotive vehicle comprising:
   an internal combustion engine having an air intake system;
   an electrical system storage battery;
   a tray comprising a bottom wall;
   fasteners fastening the tray bottom wall to underlying structure of the vehicle that is spaced from the engine;
   the battery being disposed on the bottom wall in overlying relation to the underlying vehicle structure; and
   the tray further comprising a walled compartment which adjoins the bottom wall and forms at least a portion of an air box through which intake air for the engine passes; and
   the battery being external to the air intake system.

2. An engine compartment as set forth in claim 1, the air box comprising an internal particulate filter dividing the air box into a dirty air space and a clean air space, and the portion of the air box formed by the walled compartment being the dirty air space.

3. An engine compartment as set forth in claim 1, the walled compartment comprising its own bottom wall that adjoins the tray bottom wall.

4. An engine compartment as set forth in claim 1, the fasteners hard mounting the tray bottom wall to underlying structure of the vehicle.

5. An engine compartment as set forth in claim 1, the air box being disposed between the battery and the engine.

6. An engine compartment as set forth in claim 1, the tray comprising an upright wall forming a compartment for the battery, and an engine-related device mounted on the upright wall external to the battery compartment.

7. An engine compartment of an automotive vehicle comprising:
   an internal combustion engine having an air intake system;
   an electrical system storage battery;
   a tray comprising a bottom wall and upright walls forming side-by-side compartments that are open at the top;
   fasteners fastening the tray bottom wall at a first of the compartments in a hard mounting to underlying structure of the vehicle that is spaced from the engine;
   the battery being disposed on the bottom wall in the first compartment;
   a cap closing the open top of a second of the compartments that adjoins the first compartment and cooperating with the second compartment to form an air box of the air intake system; and
   the battery being external to the air intake system.

8. An engine compartment as set forth in claim 7, the air box being disposed between the battery and the engine.

9. An engine compartment as set forth in claim 7, an engine-related device mounted on the upright wall of the first compartment external to the first compartment.

10. In an engine compartment of an automotive vehicle that houses an internal combustion engine having an air intake system and that also contains an electrical system storage battery;
    a tray comprising a bottom wall and upright walls forming side-by-side compartments that are open at the top;
    fasteners fastening the tray bottom wall at a first of the compartments in a hard mounting to underlying structure of the vehicle that is spaced from the engine;
    the battery being disposed on the bottom wall in the first compartment;
    a cap closing the open top of a second of the compartments that adjoins the first compartment and cooperating with the second compartment to form an air box of the air intake system; and
    the battery being external to the air intake system; and
    the bottom wall, at the second compartment, overhanging the underlying structure of the vehicle so as to be out of contact with and unattached to the underlying structure.

11. An engine compartment of an automotive vehicle comprising:
    an internal combustion engine having an air intake system;
    an electrical system storage battery;
    a tray comprising a bottom wall and upright walls forming side-by-side compartments that are open at the top and that share a common upright imperforate wall;
    the battery being disposed in a first of the compartments; and
    a cap closing the open top of a second of the compartments that adjoins the first compartment and cooperating with the second compartment to form an air box of the air intake system.

12. In an engine compartment of an automotive vehicle that houses an internal combustion engine having an air intake system and that also contains an electrical system storage battery;
    a tray comprising a bottom wall and upright walls forming side-by-side compartments that are open at the top and that share a common upright imperforate wall;
    the battery being disposed in a first of the compartments; and
    a cap closing the open top of a second of the compartments that adjoins the first compartment and cooperating with the second compartment to form an air box of the air intake system; and
    fasteners engaging the bottom wall to fasten the battery compartment in a hard mounting to underlying structure of the vehicle that is spaced from the engine, and the air box overhanging the underlying structure of the vehicle so as to be out of contact with and unattached to the underlying structure.

* * * * *